(12) United States Patent
Andersson et al.

(10) Patent No.: US 9,945,327 B2
(45) Date of Patent: Apr. 17, 2018

(54) METHOD AND APPARATUS FOR CONTROLLING TURBINE EFFICIENCY (71) Applicant: VOLVO LASTVAGNAR AB, Göteborg (SE)

(72) Inventors: Per Andersson, Malmö (SE); Martin Bauer, Anderslöv (SE)

(73) Assignee: Volvo Lastvagnar AB, Göteborg (SE)

( * ) Notice: Subject to any disclaimer, the term of this patent is extended or adjusted under 35 U.S.C. 154(b) by 668 days.

(21) Appl. No.: 14/093,560

(22) Filed: Dec. 2, 2013

(65) Prior Publication Data
US 2014/0083096 A1 Mar. 27, 2014

Related U.S. Application Data (63) Continuation of application No. 13/202,361, filed as application No. PCT/SE2009/000096 on Feb. 19, 2009.

(51) Int. Cl.
| | |
|---|---|
| *F02B 37/12* | (2006.01) |
| *F02M 25/07* | (2006.01) |
| *F02B 37/24* | (2006.01) |
| *F02D 23/00* | (2006.01) |
| *F02D 41/00* | (2006.01) |
| *F02M 26/05* | (2016.01) |
| *F02M 26/02* | (2016.01) |
| *F02M 26/10* | (2016.01) |

(52) U.S. Cl.
CPC ......... *F02M 25/0704* (2013.01); *F02B 37/12* (2013.01); *F02B 37/24* (2013.01); *F02D 23/00* (2013.01); *F02D 41/0007* (2013.01); *F02D 41/0077* (2013.01); *F02M 26/02* (2016.02); *F02M 26/05* (2016.02); *F02M 26/10* (2016.02); *Y02T 10/144* (2013.01); *Y02T 10/47* (2013.01)

(58) Field of Classification Search
CPC .......... F02D 23/00; F02B 37/02; F04D 27/02
See application file for complete search history.

(56) References Cited

U.S. PATENT DOCUMENTS 4,235,076 A * 11/1980 Meloche .................. F01N 3/20
60/280
6,311,494 B2 * 11/2001 McKinley ............... F01D 25/24
60/602

(Continued)

FOREIGN PATENT DOCUMENTS

DE         4312077 C1 *  1/1994  ............ F01D 5/081
DE        10232519 A1     1/2004

OTHER PUBLICATIONS

DE 4312077C1 English Translation Attached (Machined translation carried out on May 10, 2013).*

(Continued)

*Primary Examiner* — Mark Laurenzi
*Assistant Examiner* — Shafiq Mian
(74) *Attorney, Agent, or Firm* — WRB-IP LLP (57) ABSTRACT A method of controlling turbine efficiency in a turbo unit provided on an internal combustion engine includes providing a flow of gas in an area upstream a turbine at a direction different to the flow of exhaust gases in the same area, regulating the flow by a valve, and controlling the valve from a control unit having at least boost pressure and/or EGR flow as input parameters.

18 Claims, 8 Drawing Sheets

(56) References Cited

U.S. PATENT DOCUMENTS

| | | | | |
|---|---|---|---|---|
| 6,422,014 B1* | 7/2002 | Gladden | ............... | F01D 17/105 |
| | | | | 123/564 |
| 6,694,736 B2* | 2/2004 | Pfluger | ................ | F01N 13/107 |
| | | | | 123/559.1 |
| 6,766,645 B2* | 7/2004 | Zimmer | .................. | F01D 25/24 |
| | | | | 415/102 |
| 7,165,403 B2* | 1/2007 | Sun | ....................... | F02B 37/013 |
| | | | | 60/605.2 |
| 2006/0042246 A1* | 3/2006 | Gray, Jr. | ................. | F01D 17/14 |
| | | | | 60/612 |
| 2009/0094009 A1* | 4/2009 | Muller | ............... | F02D 41/0007 |
| | | | | 703/7 |
| 2009/0255517 A1* | 10/2009 | Ishikawa | .............. | F02B 37/013 |
| | | | | 123/562 |

OTHER PUBLICATIONS

European Search Report (dated Apr. 16, 2014) for corresponding European App. EP 09 84 0499.

* cited by examiner

A. Normal flow through nozzles

B. Induced crossflow

METHOD AND APPARATUS FOR CONTROLLING TURBINE EFFICIENCY

The present application is a continuation of U.S. application Ser. No. 13/202,361, filed Aug. 19, 2011, which was the U.S. national stage of international Application No. PCT/SE2009/000096, filed Feb. 19, 2009.

BACKGROUND AND SUMMARY

The present invention relates to a method and an apparatus for controlling turbine efficiency in a turbo unit provided on an internal combustion engine.

Turbochargers are well known and widely used with combustion engines for purpose of increasing power output, decreasing fuel consumption and emissions, and compensating for air density loss at high altitudes. Generally, turbochargers supply an increased charge air supply for the combustion process than can otherwise be induced through natural aspiration by utilizing exhaust gas energy to drive an air compressor. This increased air supply allows more fuel to be burned, thereby increasing power and output not otherwise obtainable from an engine having a given cylinder displacement under natural aspiration conditions. Variable geometry turbochargers (VGTs) allow the intake airflow to be optimized over a range of engine speeds. This may be accomplished by changing the angle of the inlet guide vanes on the turbine stator. An optimal position for the inlet guide vanes is determined from a combination of desired torque response, fuel economy, and emission requirement.

EGR systems are used to reduce NOx emissions by increasing the dilution fraction in the intake manifold. EGR is typically accomplished with an EGR valve that connects the intake manifold with the exhaust manifold.

In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

On an EGR engine with a variable geometry turbine (VGT) airflow and EGR flow are controlled by the VGT position and the EGR valve. The EGR drive pressure is dependent on turbo efficiency and exhaust temperature. At high turbo efficiencies and/or high exhaust temperatures the EGR drive pressure will be insufficient and large EGR valve areas in combination with small VGT positions have to be used to increase the boost pressure and by that reduce the exhaust temperature and finally drive an adequate amount of EGR. Increasing the boost pressure also normally decreases turbo efficiency which also helps give EGR drive pressure.

This means that, if the turbo efficiency is too high, the boost pressure and other limits on the engine, e.g. turbo speed, max cylinder pressure, compressor temperature, will be too high when the VGT position is decreased to achieve sufficient EGR drive pressure.

To create enough EGR drive pressure the turbo and/or engine are today matched or modified for lower effective turbo efficiency in a way that none of the limits are exceeded in any engine operating point. A consequence of this is a fuel and emission penalty due to increased gas exchange losses and lower lambda in areas where the limits are not reached which may be a problem. The EGR control range will also be limited and sets a limit to the maximum power/torque achievable from the engine which also may be a problem.

It is desirable therefore to overcome the above mentioned problems with gas exchange losses and limited EGR range for a turbo unit.

According to a first aspect of the invention it is provided a method of controlling turbine efficiency in a turbo unit for an internal combustion engine, comprising the steps of: providing a flow of gas in an area upstream a turbine rotor at a direction different to the flow of exhaust gases in the same area, regulating said flow by a valve, controlling said valve from a control unit having at least boost pressure and/or EGR flow as input parameters.

An advantage of an aspect of the present invention is that it enables optimal use of turbo efficiency during a wide operating range.

Another advantage of an aspect of the present invention is that it gives increased controllability of the engine, e.g., turbo speed, compressor temperature, peak cylinder pressure, reduces fuel consumption and increases maximum reachable power/torque from the engine.

In another example embodiment according to an aspect of the present invention it further comprises the step of providing in said area a plurality of outlets for said flow of gas.

An advantage of this embodiment is that it may further increase the controllability of the engine.

In still another example embodiment according to an aspect of the present invention it further comprising the step of providing an on-off valve in each of said outlets.

An advantage of this embodiment is that simple on-off valves arranged in a plurality of outlets may result in a fine adjustment of the flow provided in said area, i.e. by opening one or more of the valves one may regulate the flow in small increments.

In still another example embodiment it further comprising the step of providing a variable valve in each of said outlets.

An advantage of this embodiment is that not only adding another flow by opening another outlet one may also adjust the flow from one single outlet as such, i.e., a further fine adjustment of the flow of gas into the area is possible which in turn may further increase the controllability of the engine.

In still another example embodiment it further comprising the step of providing said valve outside a turbo unit housing.

An advantage of this embodiment is that it is an inexpensive and simple solution which can be applied to existing turbo units.

In still another example embodiment of an aspect of the present invention it further comprising the step of integrating said valve in a turbo unit housing.

An advantage of this embodiment is that it gives a compact turbo unit which may be used in cases where space is limited.

In still another example embodiment of an aspect of the present invention it further comprising the step of providing said flow of gases from a volute of the turbo unit.

An advantage of this embodiment is that it may be a compact solution.

In still another example embodiment of an aspect of the present invention it further comprising the step of providing said flow of gases from an exhaust gas manifold.

An advantage of this embodiment is that the piping from the exhaust manifold to the turbo unit may be short and simple.

In still another example embodiment according to an aspect of the present invention it further comprising the step of providing said flow of gases from an outlet downstream of a compressor of said turbo unit or from an external compressor tank.

An advantage of this embodiment is that it gives sufficient flow of gas at the same time as it may cool down the turbo unit since such flow of gas has a substantially lower temperature than the exhaust gases.

According to a second aspect of the invention it is provided a system for controlling turbine efficiency in a turbo unit for an internal combustion engine comprising at least one outlet arranged in a turbine scroll outlet for providing a flow of gas in a direction different to the direction of exhaust gases in said turbine scroll outlet; a valve arranged between a source for providing a flow of gas and said outlet in said turbine scroll outlet for regulating the flow of the gas; and a control unit for controlling said valve where said control unit has at least boost pressure and/or EGR flow as input parameters.

According to a third aspect of the invention it is provided a vehicle comprising a system for controlling turbine efficiency in a turbo unit for an internal combustion engine comprising at least one outlet arranged in a turbine scroll outlet for providing a flow of gas in a direction different to the direction of exhaust gases in said turbine scroll outlet; a valve arranged between a source for providing a flow of gas and said outlet in said turbine scroll outlet for regulating the flow of the gas; and a control unit for controlling said valve where said control unit has at least boost pressure and/or EGR flow as input parameters.

BRIEF DESCRIPTION OF THE DRAWINGS

The present invention together with the above mentioned and other objects and advantages may best be understood from the following detailed description of the embodiments, but not restricted to the embodiments, wherein is shown schematically.

DETAILED DESCRIPTION

Figure 1:
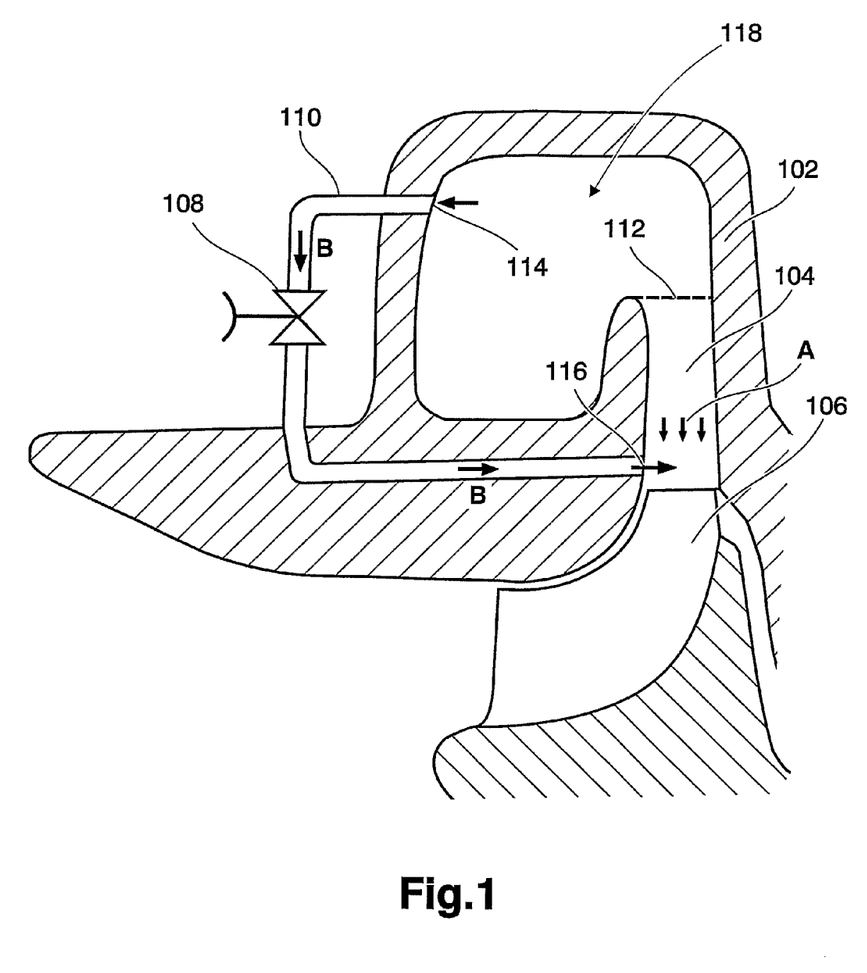
FIG. 1-5 depicts cross sections of a part of a turbo unit according to different example embodiments of the present invention.

FIG. 1-5 depicts cross sections of a part of a turbo unit according to different example embodiments of the present invention. FIG. 1 depicts a volute housing 102, a vane 104, a turbine rotor 106, valve 108, pipe 110, gas flow inlet 114, gas flow outlet 116, volute 118. The volute housing 102 is part of the complete turbo unit housing, which also inter alia comprises a bearing housing and a compressor housing, which are not illustrated in FIG. 1-5. The turbo unit housing is in the present context defined as any part which make up the complete turbo unit.

Exhaust gas from an internal combustion engine flows into the volute 118 in a direction indicated by arrows A in FIG. 1-5. When exhaust gas is passing the turbine 106 said turbine starts to rotate. The embodiment in FIG. 1 is also provided with adjustable vanes 104 for increasing or decreasing the flow of exhaust gas through the turbine. A flow of gas is provided by an outlet 116 which is arranged in a turbine scroll area. The turbine scroll area may be defined as an area restricted in a downstream direction of the exhaust gases by the turbine 106 and in an upstream direction of the exhaust gases by a line 112. In FIG. 1, the source of the flow of gas which is provided by the outlet 116 into the turbine scroll area is exhaust gases taken from the volute 118. The gas flow inlet 114 is provided in the volute housing 102 at a suitable position. Between said gas flow inlet 114 and said gas flow outlet the valve 108 is arranged for regulating the flow of gas through the outlet 116. In FIG. 1 said valve 108 is arranged in a piping 110. A direction of flow of gases in the piping 110 and in the volute housing 102 is indicated by B.

The exhaust gases provided into the inlet 114 and released by the outlet 116 can be said to be a small amount of nozzle or vane by-pass flow, since the exhaust gases in fact are bypassed the vane 104. The amount of bypassed exhaust gases may be up to about 30% of total exhaust flow, more preferably less than 15% and most preferably less than 10% of the total exhaust flow. Said flow of gas provided into the turbine scroll area is flowing in a direction different to the direction of exhaust gases in said turbine scroll area, i.e., said flow of bypass gas B is to be fed cross the main flow.

This flow of gas cross the main flow may destroy the impulse of the main flow. The reason for the reduction of main flow is that the cross flow from outlet 116 is forming a counter swirl or an air barrier.

This counter swirl or air barrier will reduce turbine performance that could be seen as equivalent to a controlled reduction of turbine efficiency. The acceleration of the flow in the nozzle reduces the static pressure in the turbine scroll outlet area and provides enough drive pressure for the required by-pass flow rate.

The valve 108, on-off type or variable, may be used to control the bypass flow into the turbine scroll outlet. The valve 108 in combination with a VGT (Variable Geometry Turbine). i.e., the adjustable vanes or nozzles 104, will provide a measure of controlling the turbo efficiency and hence an EGR drive pressure, turbo speed etc. to an optimum level.

Figure 2:
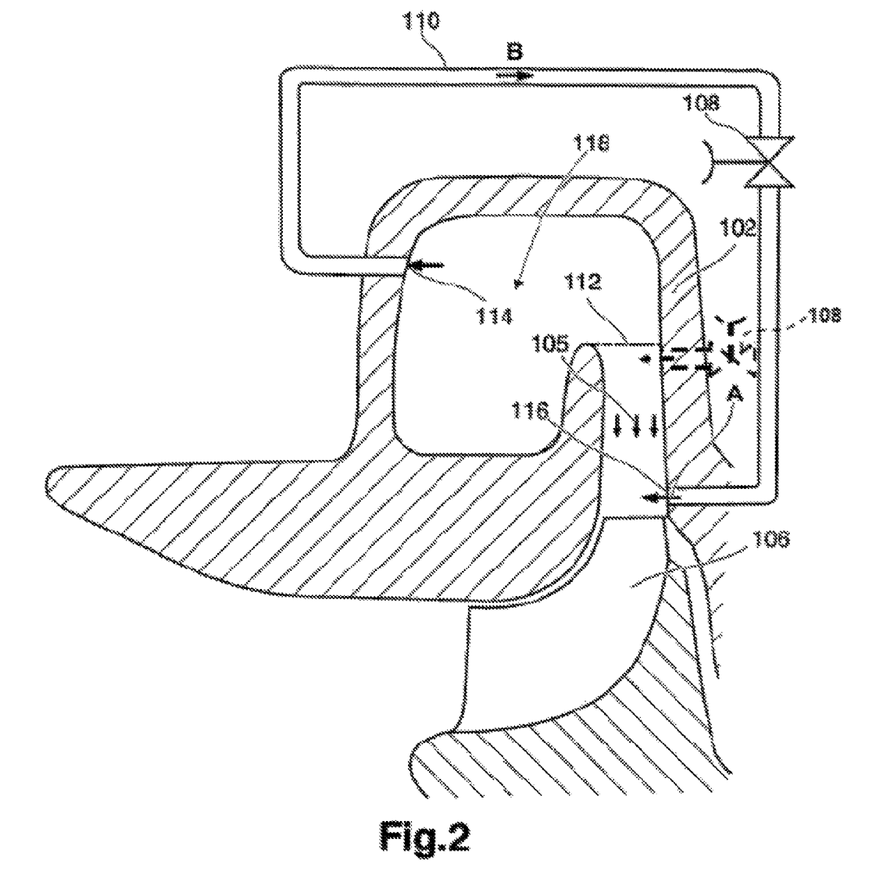

FIG. 2 depicts another example embodiment of the present invention. The difference between FIG. 1 and FIG. 2 is the position of the outlet 116 and possibly the position of the valve 108 since the pipe 110 is somewhat different to the piping in FIG. 1. Another difference between FIG. 1 and FIG. 2 is that FIG. 2 illustrates a turbine without VGT, i.e., no vanes or nozzles as in FIG. 1. The turbine scroll outlet has been denoted 105 in FIG. 2 and as in FIG. 1 is restricted by line 112 and the turbine 106.

Figure 3:
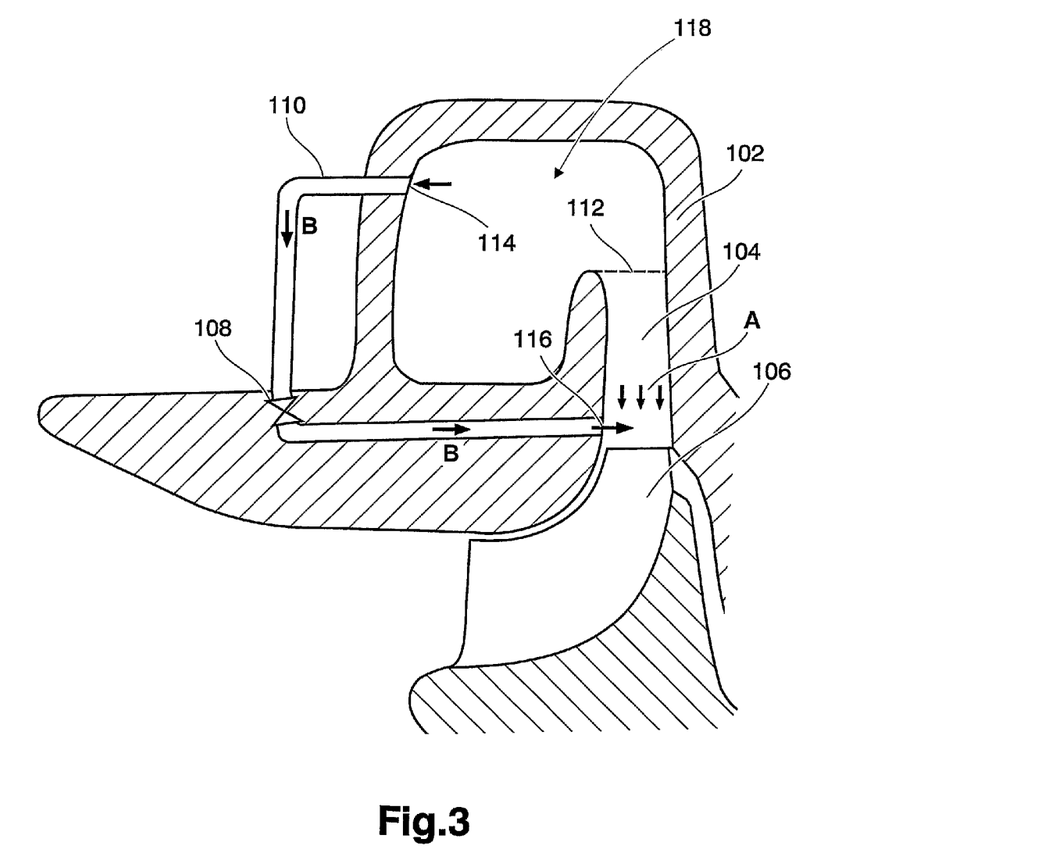

FIG. 3 depicts yet another example embodiment of the present invention. The only difference between FIG. 1 and FIG. 3 is that in FIG. 3 the valve is integrated in the volute housing 102. The valve may be controlled electrically, pneumatically or hydraulically. It may be any type of valve available, e.g., sliding valve, butterfly valve, piston valve etc.

Figure 4:
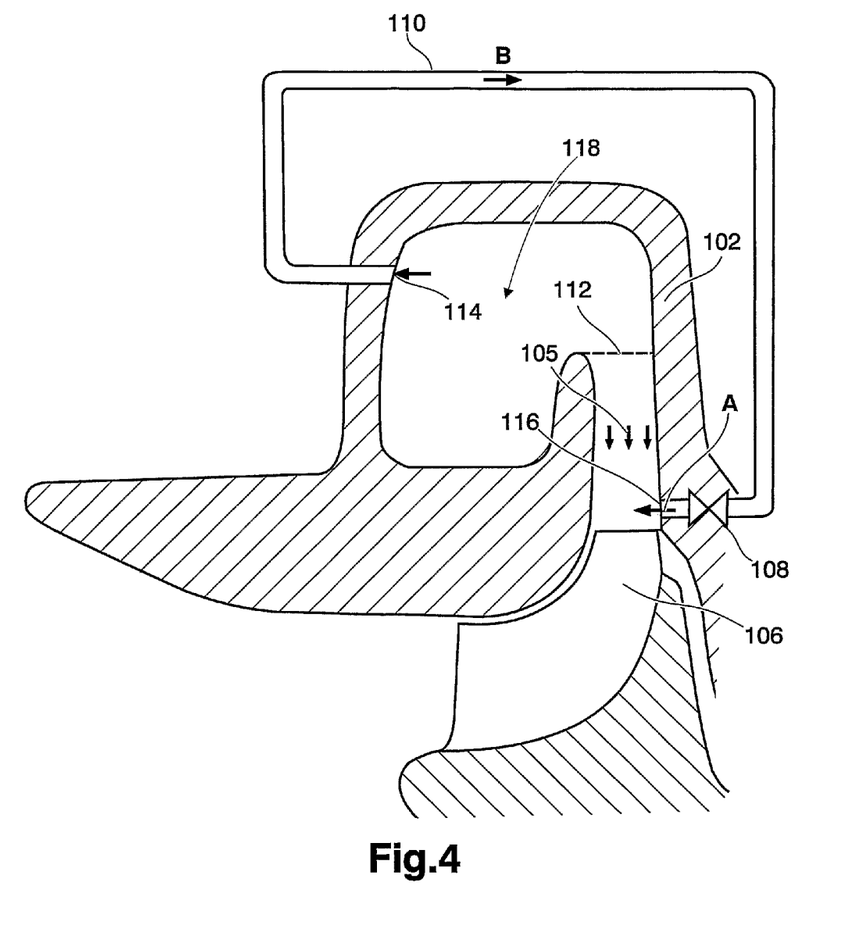

FIG. 4 depicts yet another example embodiment of the present invention. The only difference between FIG. 2 and FIG. 4 is that in FIG. 4 the valve is integrated in the volute housing 102. The valve may be controlled electrically, pneumatically or hydraulically. It may be any type of valve available, e.g., sliding valve, butterfly valve, piston valve etc. The volute housing may be built up of more than a single unit, for instance may a separate nozzle ring comprise a part of the volute housing. In the case of such separate nozzle ring being part of the volute housing said valve 108 may be integrated in said nozzle ring.

Figure 5:
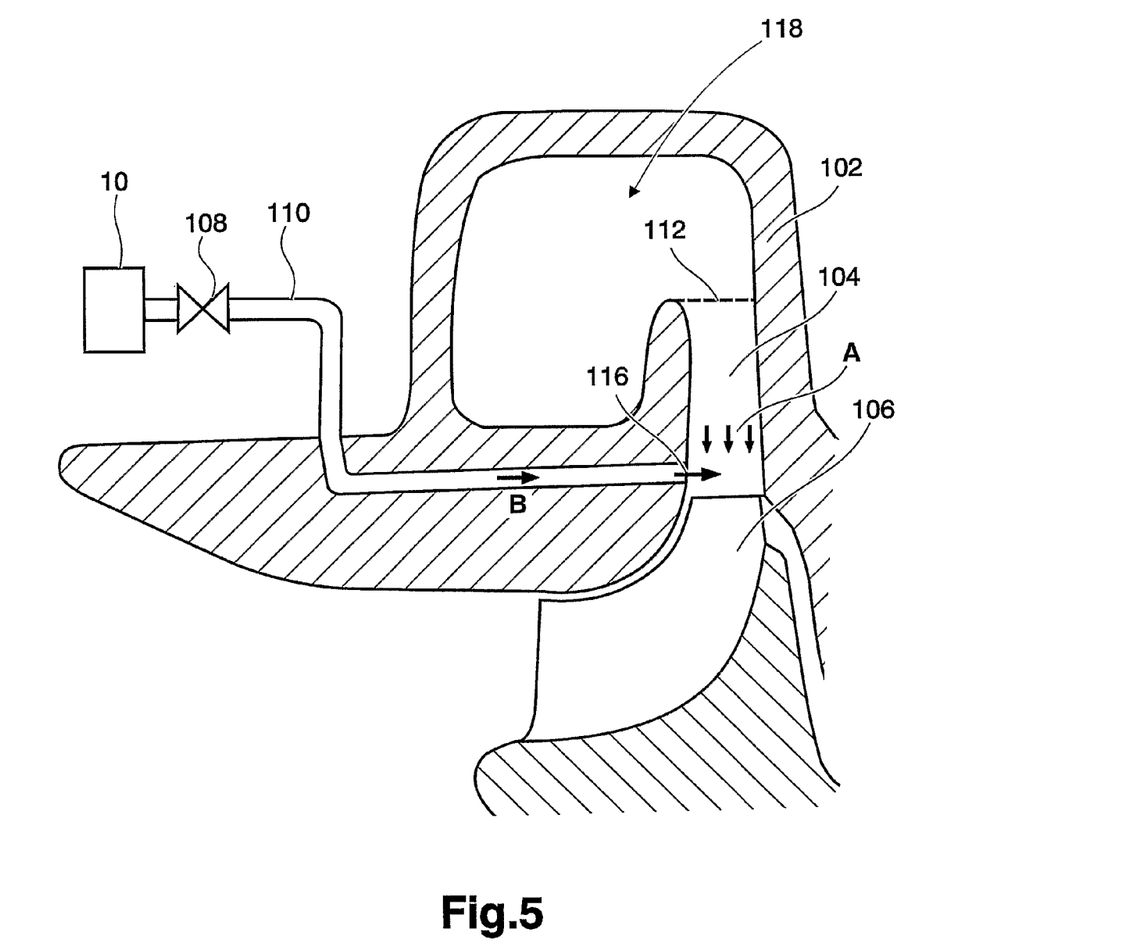

FIG. 5 depicts still another example embodiment of the present invention. This embodiment differs from the ones illustrated in FIG. 1-4 in that the gas flow B is originating from another source 10 than the volute 118. The source 10 may be an external air pressure tank, for instance the same air pressure tank that is used for assisting the brakes, for assisting the gear box and/or for assisting the suspension. Another source 10 may be air pressure taken from any point between the turbocharger and the intake manifold. Still another source 10 may be exhaust gases taken from the exhaust manifold.

In the embodiments depicted in FIG. 1-5 there is only illustrated one outlet 116 into the vane less area (i.e., at least partly downstream the vane) or turbine scroll outlet area 105. However, one or a plurality (shown in phantom in FIG. 2) of outlets may be used for providing a flow of gas into the vane less area or turbine scroll outlet area 105. Also possible is to combine one or more of the embodiments as illustrated in FIG. 1-5, i.e., for instance combining FIGS. 1 and 2 will give an embodiment in which the flow of gas is entering the vane less area or turbine scroll outlet area 105 from two different directions simultaneously. The direction of flow B into the vane less area or turbine scroll outlet area. 105 should be in a direction different the flow of exhaust gases denoted by A. In one embodiment said flow of gas B is entering the vane less area or turbine scroll outlet area 105 at a perpendicular direction to the flow of exhaust gases A.

By introducing the cross flow between nozzle and rotor, the flow downstream the turbine will be made more stabilized and homogenous since all flow is expanded in the rotor and thereby the possibility of stratifications in flow and temperature that could have negative effect on down stream components (e.g. low pressure turbine or exhaust after treatment systems) may be reduced.

By introducing the cross flow with a counter swirl (a tangential component in the opposite direction of the main flow) the effectiveness of the counter flow would be increased thereby making it possible to reduce the cross flow and thus limiting the dimension of valve and ducting.

A suitable counter swirl should be in the 30-70 degrees range from radial and in opposite direction to the main flow.

The crossflow would maintain a higher pressure ratio over the turbine when in use compared to a bypass method since the required cross flow could be lower and all flow will pass the turbine rotor. This higher pressure ratio would be beneficial for the EGR system.

In a variable geometry turbine the nozzles don't need to be closed as much as for a bypass solution for the same reason and could reduce the risk for mechanical failures (e.g. high cycle fatigue)

Figure 6:
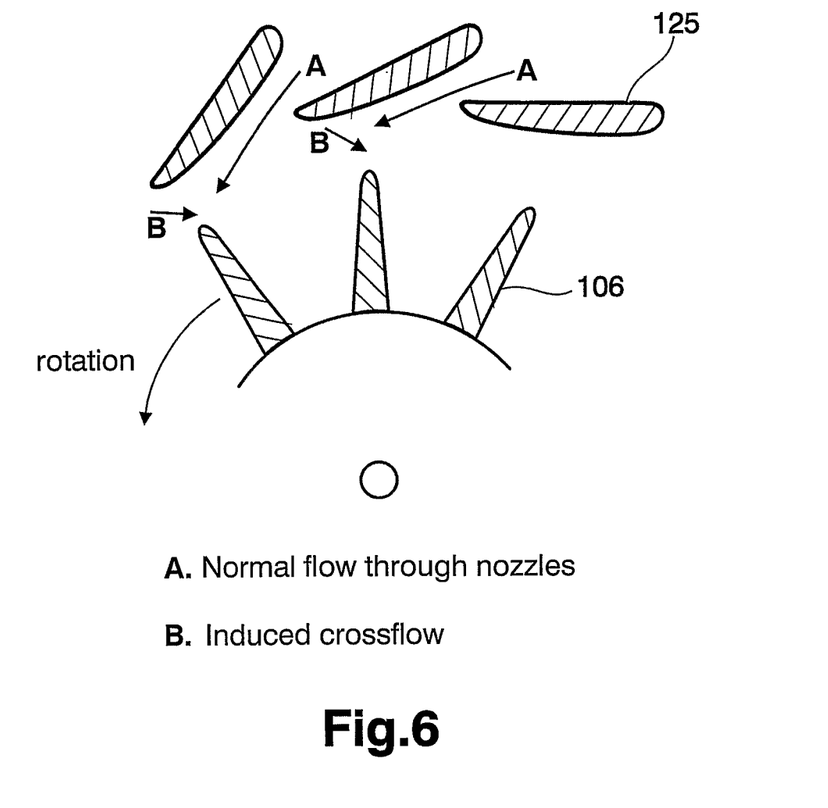
FIG. 6 depicts a cross sectional side view of the turbine and vanes in a turbo unit according to the present invention.

FIG. 6 depicts a cross sectional side view of the turbine 106 and vanes 125 in a turbo unit according to the present invention. In this figure it is illustrated how the flow of exhaust gases denoted by A flow in a first direction and the flow of gas denoted by B in another direction. From FIG. 6 it is also clear that the flow of gas B may be introduced in the vane less area, i.e., in the area between the turbine and the vanes.

Figure 7:
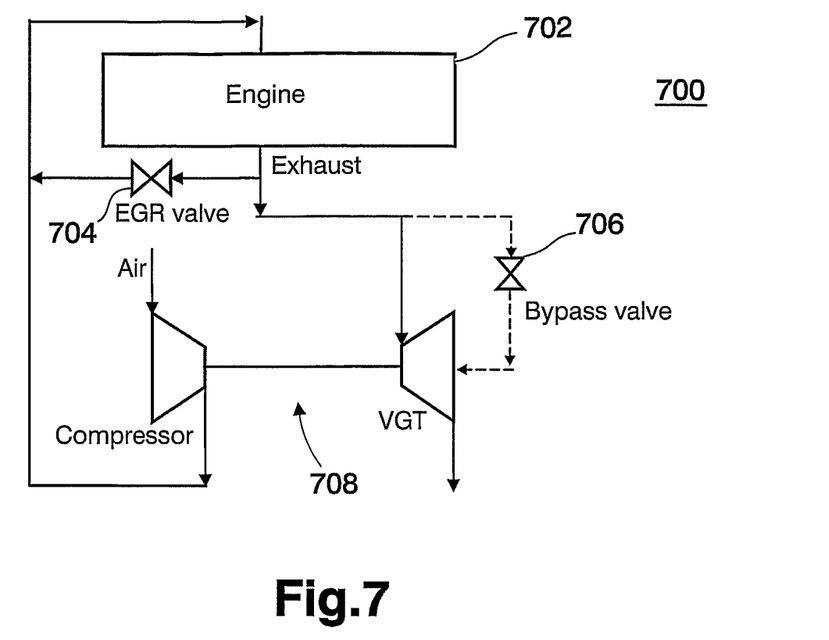
FIG. 7 depicts schematically an example embodiment of the present invention provided on an internal combustion engine

FIG. 7 depicts a schematic presentation 700 of air and exhaust flows to and from an internal combustion engine 702. The engine 702 is provided with an EGR valve 704 a turbo unit 708 and a bypass valve 706. Exhaust gas flows from the internal combustion engine 702 in a direction to an EGR valve or to a turbine rotor in said turbo unit 708. A part of the exhaust gases provide for the turbine rotor may be bypassed by means of the bypass valve 706 according to the present invention as illustrated in FIG. 1-5. Air is supplied to the engine via a compressor. The air provided to the engine may contain exhaust gases by said EGR valve 704.

The turbo unit 708 may be of any type, for instance one with constant swallowing capacity (fixed geometry) one that alters the swallowing capacity, a single stage VGT or a dual stage system with high pressure VGT. The turbine rotor may be of radial type, mixed flow type or axial type. The range of angles of the vanes in the VGT may be 50°-86° but more preferably between 60°-84° from radial.

Figure 8:
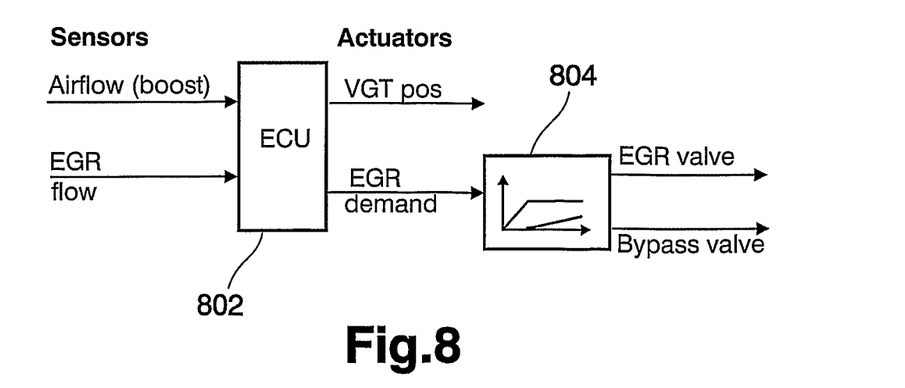
FIG. 8 depicts a schematic flowchart of an example embodiment of the method according to the present invention

FIG. 8 depicts a schematic flowchart of an example embodiment of the method according to the present invention. In FIG. 8 a control unit 802 receives information form different sensors inter alia an airflow sensor and an EGR sensor. The ECU 802 controls the position of the vanes in the VGT and the EGR demand. EGR demand is further provided as an input to a valve control unit 804 which control the position of the EGR valve 704 and the bypass valve 706.

The sensor for air flow can be an airflow sensor, a boost pressure sensor or other sensors that can be used to extract air flow or lambda. The EGR flow sensor can be any type of sensor, simulated or real that represents the EGR flow. Additional sensors for engine operating regime will normally be added plus limiting parameters like turbo speed. The ECU can include any suitable control algorithm with open loop, closed loop, forward feed or other methods including multi variable control and optimizing means.

The split of the EGR demand signal can be electric or mechanical.

Figure 9:
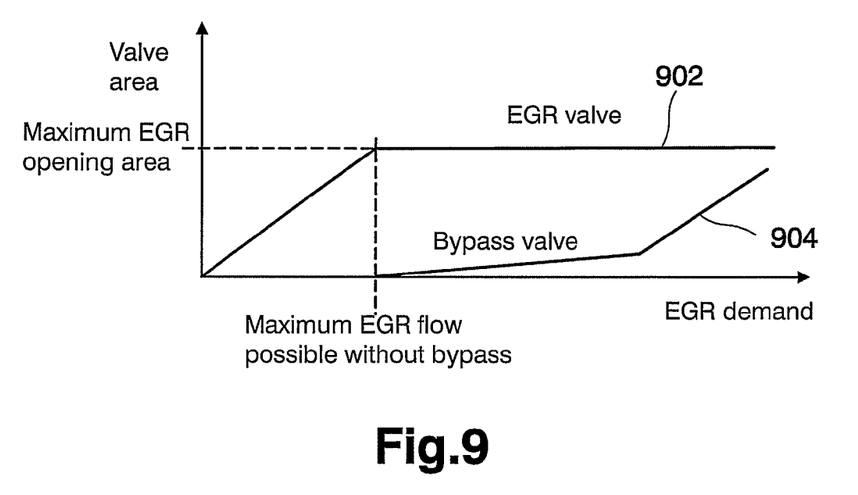
FIG. 9 depicts a diagram of valve area as a function of EGR demand for prior art embodiment and the present invention

FIG. 9 depicts a diagram of valve area as a function of EGR demand for prior art embodiment and the present invention. Y axis represents valve area and X axis represents FOR demand. A first curve 902 represents EGR valve and a second curve 904 represents the bypass valve. When optimum amount of EGR is reached with a not fully opened EGR valve, no bypass flow is assumed necessary since the EGR drive pressure is enough. If the EGR demand is higher than achieved with fully opened EGR valve, the bypass valve enables further EGR drive pressure. The bypass valve (in combination with the VGT) controls the turbo efficiency to a level where the EGR valve is fully opened with lowest possible pressure losses, gas exchange work and lower fuel consumption as a consequence.

The method can be used also for added functions like in heat mode operation, i.e. when the exhaust temperature isn't high enough for the exhaust after treatment system (EATS) to function, the exhaust temperature can be increased. This can be done by lowering the amount of air (lambda) and decreasing engine efficiency that increases the amount of burnt fuel needed for a given power output. The air/fuel ratio must however be kept over certain value to keep the soot production under control. Sufficient exhaust temperature can be achieved by controlling the turbo efficiency and boost pressure by varying the EGR valve, VGT position and bypass flow. Such operation needs a decoupling of the bypass valve and the EGR valve operation. The invention may be applied to any internal combustion engine such as diesel engine, gasoline engine, bifuel/flexifuel engine with one or a plurality of cylinders. The engines may be arranged in vehicles such as cars, trucks, loaders, etc. The engine may also be stationary or arranged in boats.

The invention must not be regarded as being limited to the examples of embodiment described above, a number of further variants and modifications being, feasible without departing from the scope of the following claims.

The invention claimed is:

1. A method of controlling turbine efficiency in a turbo unit for an internal combustion engine, comprising:
   supplying a flow of exhaust gases in an area upstream of a turbine rotor in a direction of the flow of exhaust gases in the area, the turbine rotor being disposed in a turbine comprising a scroll having a scroll passage,
   causing a portion of the flow of the exhaust gas to flow via a bypass from the scroll passage back into the scroll passage in the area upstream of the turbine rotor in a direction different to the flow of exhaust gases in the area,
   regulating the portion of the flow of the exhaust gas by a valve, and
      controlling the valve from a control unit having at least one of boost pressure and/or exhaust gas recirculation (EGR) flow as input parameters.

2. The method according to claim 1, further comprising providing in the area a plurality of outlets for the portion of the flow of the exhaust gas.

3. The method according to claim 2, further comprising providing an on-off valve in each of the outlets.

4. The method according to claim 2, further comprising providing a variable valve in each of the outlets.

5. The method according to claim 1, further comprising providing the valve outside a turbo unit housing.

6. The method according to claim 1, further comprising integrating the valve in a turbo unit housing.

7. The method according to claim 1, further comprising:
   providing at least part of the flow of the exhaust gas from an exhaust gas manifold.

8. The method according to claim 1, further comprising:
   providing at least part of the flow of the exhaust gas from an outlet downstream of a compressor of the turbo unit or from an external compressor tank.

9. The method according to claim 1, further comprising:
   providing the turbo unit with adjustable vanes, and
   providing the flow of the exhaust gas in a vane less space at least partially downstream the vanes and upstream the turbine.

10. The method according to claim 1, comprising controlling the valve from the control unit having both boost pressure and EGR flow as input parameters.

11. A system for controlling turbine efficiency in a turbo unit for an internal combustion engine comprising
   a turbine comprising a turbine rotor and a scroll having a scroll passage and a turbine scroll outlet;
   at least one outlet arranged in the turbine scroll outlet for providing a flow of a portion of exhaust gas from the scroll passage back into the turbine scroll outlet in a direction different to the direction of exhaust gases in the turbine scroll outlet;
   at least one valve arranged between a source for providing the portion of the flow of the exhaust gas and the at least one outlet for regulating the flow of the exhaust gas; and
   a control unit arranged to control the valve where the control unit has at least one of boost pressure and/or exhaust gas recirculation (EGR) flow as input parameters.

12. The system according to claim 11, wherein, for each outlet of the at least one outlet, one valve of the at least one valve is arranged between the source for providing a flow of gas and the outlet, and where the valve is at least one of an on-off type valve or a continuously variable valve.

13. The system according to claim 11, wherein at least one valve of the at least one valve is provided outside a housing of the turbo unit.

14. The system according to claim 11, wherein at least one valve of the at least one valve is integrated in a housing of the turbo unit.

15. The system according to claim 11, wherein the source for providing the portion of the flow of the exhaust gas comprises one or more of the group of: exhaust gases from the internal combustion engine, boost pressure from the compressor of the turbo unit, air pressure tank.

16. The system according to claim 11, wherein the turbo unit comprises adjustable vanes and where the at least one outlet for providing the flow of the portion of the exhaust gas into the turbine scroll outlet is provided in a vane less space at least partially downstream the vanes and upstream the turbine.

17. A vehicle comprising a system according to claim 11.

18. The system according to claim 11, wherein the control unit is arranged to control the valve where the control unit has both boost pressure and EGR flow as input parameters.

* * * * *